United States Patent [19]

Todd

[11] Patent Number: 4,929,356
[45] Date of Patent: May 29, 1990

[54] ENVIRONMENT PROTECTOR FOR REPLACEABLE CARTRIDGE FILTERS

[75] Inventor: John A. Todd, Berlin, Md.

[73] Assignee: Dresser Industries, Inc., Dallas, Tex.

[21] Appl. No.: 200,396

[22] Filed: May 31, 1988

[51] Int. Cl.[5] .............................................. B01D 27/00
[52] U.S. Cl. .................................................. 210/248
[58] Field of Search ................... 220/85 R, 85 H, 1 R; 210/248

[56] References Cited

U.S. PATENT DOCUMENTS

| | | | |
|---|---|---|---|
| 1,647,799 | 11/1927 | Hammer | 210/248 X |
| 2,702,636 | 2/1955 | Brown | 210/248 |
| 4,376,703 | 3/1983 | Krauss | 210/248 X |
| 4,451,368 | 5/1984 | Pandelena et al. | 210/248 X |
| 4,692,245 | 9/1987 | Church et al. | 210/248 X |

Primary Examiner—John C. Fox
Attorney, Agent, or Firm—Baker, Mills & Glast

[57] ABSTRACT

A protective cover (10) is provided to contain any spillage of liquid during changing of a filter cartridge from a filter canister assembly (12). The cover (10) comprises an elastomer that is resistant to gasoline and oil. The cover (10) is slidably positioned over the filter canister assembly (12) to form a liquid-tight seal. An outlet (30) is provided with a drainage tube (32) to remove any spillage from chamber (28) to a separate container.

5 Claims, 1 Drawing Sheet

ENVIRONMENT PROTECTOR FOR REPLACEABLE CARTRIDGE FILTERS

TECHNICAL FIELD OF THE INVENTION

This invention relates in general to environmental protective devices, and in particular to an environment protector for replaceable cartridge filters.

BACKGROUND OF THE INVENTION

Fuel dispensers at service stations usually contain fuel filters within each dispensing unit. These fuel filters are similar to oil filters on an automobile, as the filter is contained within a canister which is threaded onto an in-line connector. The internal filter must be changed regularly which requires removal of the canister from the in-line connector. Similar to the experience of changing an oil filter, unscrewing the canister for the fuel filter allows fuel to spill from the in-line connector. If not maintained in a perfectly vertical orientation during removal, fuel will also spill from the canister.

Since service stations typically have multiple dispensing units, these spills may add up to a considerable loss of fuel. This is not only an economical loss to the station but is also an environmental concern. The spilled fuel may contaminate the soil or the surrounding surfaces, and the evaporation of the fuel will contaminate the atmosphere.

It appears that California has already enacted relevant environmental protection laws, and it is anticipated that other states will also be passing laws concerning the loss of volatile fuels through vaporization. Thus, there is a need for a way to prevent the loss of volatile fuels and other contaminants during the replacement of in-line filters.

SUMMARY OF THE INVENTION

The present invention disclosed herein comprises a method and apparatus for an environment protector for replaceable cartridge filters which substantially eliminates or reduces problems associated with changing replaceable filters. The present invention allows the removal of a replaceable filter from an in-line connector without spilling the liquid.

In accordance with one aspect of the present invention, a protective cover for the containment of liquid released from an in-line replaceable filter is provided. A length of a hollow generally cylindrical sleeve is dimensioned to fit over a filter canister assembly in which the filter is stored. A bottom open end of the sleeve has a diameter somewhat smaller than that of the filter canister assembly diameter to form a liquid-tight seal therearound. The remainder of the sleeve has a diameter larger than the diameter of the canister assembly. A container is thus formed around the canister assembly to catch any spillage created during removal of the filter. A drainage portion is provided to allow removal of the spillage from the sleeve without being released to the environment.

In another aspect of the present invention, the sleeve comprises an oil and gasoline resistant elastomer. The length of the sleeve is less than the length of the filter canister assembly to allow removal of the filter while holding the sleeve in place. A flexible tube is added to the outlet to allow drainage of the spillage into a separate container.

It is a technical advantage of the present invention that pollution of the atmosphere by vaporization of volatile fuels is prevented by containment of spillage during removal of a replaceable in-line filter. It is a further technical advantage of the present invention that loss of costly fuels by spillage is prevented.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
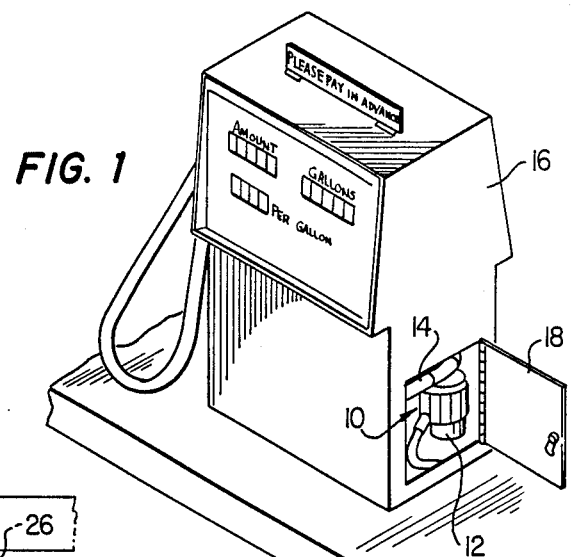
FIG. 1 is a perspective view of a fuel dispenser with an internal in-line filter protected by the present invention.
Figure 2:
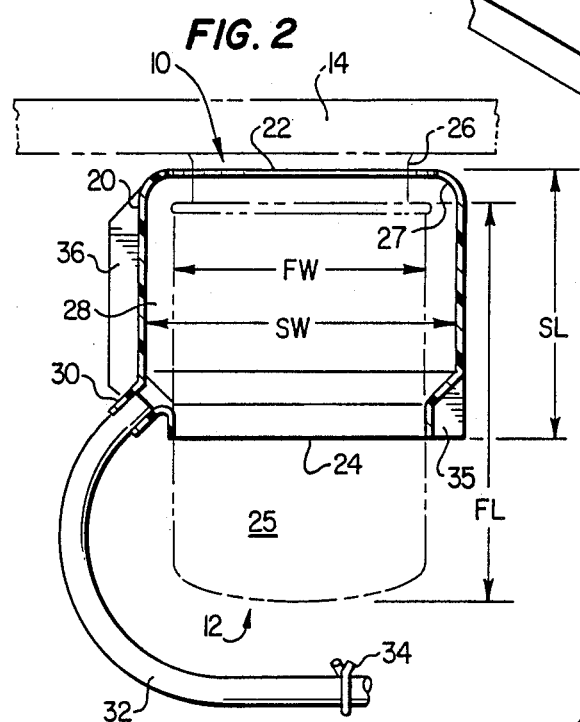
FIG. 2 is a cross-sectional view of the preferred embodiment of the present invention.

In FIGS. 1 and 2, like items are identified by like and corresponding numerals for ease of reference. Referring to FIG. 1, an environment protector in accordance with the preferred embodiment of the present invention is generally identified by the reference numeral 10. The protector 10 is fitted over a generally vertical in-line filter canister assembly 12. Although not shown, it is to be understood that assembly 12 may have other orientations to include generally horizontal, and the protector 10 will work equally as well. Canister assembly 12 is attached to a fuel line 14 contained within the fuel dispensing unit 16. To change the canister of assembly 12, it is necessary to open the door 18 to the dispensing unit 16 or remove an exterior panel and reach inside. It is awkward for an operator to remove the filter canister assembly 12 without spilling fuel due to the cramped conditions within the dispensing unit 16. The environment protector 10 provides a means for containment of any spillage occurring during removal of the filter canister assembly 12 under such cramped conditions.

Referring to FIG. 2, the environment protector 10 is shown in cross-section. Environment protector 10 comprises a length of a hollow generally cylindrical sleeve 20 having a first open end 22 and a second open end 24. Sleeve 20 comprises a flexible material such as an elastomer that is oil and gasoline resistant.

Filter canister assembly 12 comprises a canister 25 and a canister connector 26 which is integral with fuel line 14. Canister 25 is threadably attached to connector 26. First end 22 of sleeve 20 is equal to or preferably slightly larger in diameter than canister 25 and turned inwardly to form arcuate surface 27 proximate the corresponding diameter of the connector 26. Second end 24 is slightly smaller in diameter than the corresponding diameter of the canister 25 with which it is placed in contact forming a liquid tight seal therebetween.

The length SL of the sleeve 20 is less than the length FL of canister 25. Canister 25 thus protrudes beyond the second open end 24 which allows the use of a device such as a strap wrench, not shown, to turn the canister 25 without turning the sleeve 20. Holding the sleeve 20 in place while turning the canister 25 is desirable as will be subsequently described in more detail.

The sleeve diameter SW (except for first and second open ends 22 and 24) is greater than the canister assembly diameter FW which forms a chamber 28 all around canister 12. When canister 25 is removed from connector 26, any spillage will be contained by arcuate surface 27 and the chamber 28. The arcuate surface 27 is particularly advantageous when the fuel in line 14 is pressurized, as the fuel will tend to spray radially outward and be captured by arcuate surface 27.

The sleeve 20 is provided with an outlet 30 passing therethrough which may have an additional drainage tube 32 integral with or attached thereto. As spillage is collected by the chamber 28, it may be drained through outlet 30 and drainage tube 32 to a separate storage container, not shown. Tube 32 may be turned downward, in which case it is provided with sealing clamp 34, or turned upward in which case clamp 34 is not required. Thus it is desirable to be able to hold the sleeve 20 in place while turning canister 25 to prevent twisting of drainage tube 32.

Sleeve 20 may be provided with a plurality of grip lugs 35 to assist in the installation of protector 10 over filter canister assembly 12. The grip lugs 35 provide finger holds for turning and pushing the protector 10 into position. Additionally, sleeve 20 may have a handle lug 36 to provide a handle for an operator to help hold sleeve 20 in position while canister 25 is turned for removal.

In operation, a filter canister 25 is threaded onto the connector 26. When it is necessary to remove canister 25 to replace the filter cartridge, an environment protector 10 is fitted over filter canister assembly 12 by placing first open end 22 over canister 25. Then, by holding the grip lugs 35, the protector 10 is pushed onto canister 25 until first end 22 is proximate connector 26 and second end 24 is in sealing contact with canister 25.

An appropriate device, such as a strap wrench, is placed around the exposed portion of canister 25. An operator grips the handle lug 36 with one hand and the removal device with the other hand. The canister 25 is turned away from the connector 26 until the connection therebetween is broken. As the connection is broken, if the system is under pressure, fuel will spray from the canister 25/connector 26 interface. The arcuate surface 27 of first end 22 will direct this spray into chamber 28. As the fuel spills into chamber 28, it is directed toward outlet 30 which is in turn connected via drain tube 32 to a separate storage container, not shown. Once the fuel within chamber 28 has been allowed to drain through outlet 30, the canister 25 may be removed from the protector 10 and the internal filter changed. The protector 10 may then be placed on filter canister assembly 12 or another assembly for further use or stored for later use.

Figure 3:
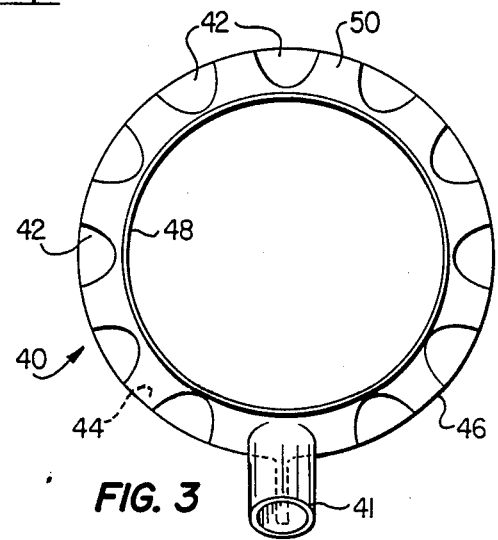
FIG. 3 is an end view of an alternate embodiment of the present invention.

Referring to FIG. 3, an end view of an alternate embodiment of an environment protector is generally identified by the reference numeral 40. Protector 40 is a hollow generally cylindrical length of elastomeric material and is shown in its distended position for the sake of clarity. An outlet 41 is provided for removing spillage.

The protector 40 is provided with a plurality of internally directed ribs 42. Ribs 42 may be molded from the same elastomer as protector 40. Ribs 42 project from the internal wall 44 of the sleeve 46 proximate the open end edge 48. Ribs 42 are spaced apart around the circumference of the internal wall 44 in order to provide a containment chamber 50 for spillage.

Ribs 42 are provided to assist in centering the sleeve 46 over a canister, not shown. The ribs 42 also act as supports to prevent the protector 40 from collapsing inwardly toward the canister causing distortion of chamber 50 and/or open end 48. It is important to insure that the ribs 42 do not protrude too far inwardly toward the canister to provide too tight a fit therebetween. A too tight fit may cause protector 40 to turn with the canister during removal which may twist a drainage tube, not shown, as previously described.

Although not shown, it is to be understood that the protector herein described may be utilized with other types of replaceable filters such as engine oil filters. Appropriate modifications necessary for such adaptations is contemplated by this disclosure.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A self-sealing cover for an in-line fuel filter, comprising:
   an elastomeric sleeve dimensioned to fit over a canister assembly;
   said sleeve having flexible first and second open ends to allow said sleeve to slidably fit over said canister assembly and form a liquid tight seal therebetween;
   said sleeve and canister assembly cooperating to form a chamber therebetween for containment of spilled fuel;
   means for removing said spilled fuel from said canister assembly without allowing said spilled fuel to contaminate the environment; and
   said means including a hole extending through said sleeve into said chamber and located adjacent the second open end of said sleeve and a flexible tube connected with said hole to allow drainage of spilled fuel from said chamber into a separate container.

2. The cover of claim 1, wherein said sleeve further comprises a handle lug to hold said sleeve in position while turning said canister to replace the filter.

3. The cover of claim 1 wherein said outlet further includes a flexible tube to allow drainage into a separate container.

4. A method for containing liquid released from a replaceable filter, comprising the steps of:
   fitting a length of a hollow generally cylindrical sleeve around a canister assembly housing the filter, said canister assembly comprising a canister threadably attached to a canister connector, said sleeve having a diameter larger than a diameter of said canister assembly but for a first open end proximate said connector having a diameter equal to or slightly larger than said diameter of said canister assembly and a second open end having a diameter somewhat smaller than said diameter of said canister assembly;
   removing said canister from said connector without removing said canister from said sleeve to allow any liquid released upon such removal to be contained by said sleeve; and
   draining the released liquid from said sleeve through an outlet extending through said sleeve proximate said second open end.

5. The method of claim 4, further comprising the step of forming a handle lug on said sleeve to assist in the step of removing.

* * * * *